United States Patent
Caruana et al.

(10) Patent No.: US 9,948,604 B2
(45) Date of Patent: Apr. 17, 2018

(54) HYBRID BUSINESS PROCESS APPLICATION FOR ACCESSING MULTIPLE CONTENT MANAGEMENT REPOSITORIES

(71) Applicant: Alfresco Software, Inc., San Mateo, CA (US)

(72) Inventors: David Caruana, London (GB); Paul Holmes-Higgin, London (GB)

(73) Assignee: Alfresco Software, Inc., San Mateo, CA (US)

( * ) Notice: Subject to any disclaimer, the term of this patent is extended or adjusted under 35 U.S.C. 154(b) by 372 days.

(21) Appl. No.: 14/743,792

(22) Filed: Jun. 18, 2015

(65) Prior Publication Data
US 2015/0370878 A1    Dec. 24, 2015

Related U.S. Application Data

(60) Provisional application No. 62/013,942, filed on Jun. 18, 2014.

(51) Int. Cl.
*G06F 9/00* (2006.01)
*H04L 29/06* (2006.01)
*H04L 29/08* (2006.01)

(52) U.S. Cl.
CPC .......... *H04L 63/02* (2013.01); *H04L 67/1095* (2013.01)

(58) Field of Classification Search
CPC ............................ H04L 63/02; H04L 67/1095
USPC ........................................................ 726/11
See application file for complete search history.

(56) References Cited

U.S. PATENT DOCUMENTS

| | | | |
|---|---|---|---|
| 2004/0187089 A1 | 9/2004 | Schulz | |
| 2012/0209947 A1* | 8/2012 | Glaser | G06F 9/5027 709/217 |
| 2012/0284724 A1* | 11/2012 | Alexander | G06F 9/5027 718/102 |
| 2014/0156028 A1* | 6/2014 | Subramaniam | H04L 12/2818 700/11 |
| 2015/0019191 A1* | 1/2015 | Maturana | G05B 17/02 703/13 |

* cited by examiner

*Primary Examiner* — Teshome Hailu
(74) *Attorney, Agent, or Firm* — Mintz Levin Cohn Ferris Glovsky and Popeo, P.C.

(57) ABSTRACT

Hybrid, configurable business process applications can be used in conjunction with features of a content management system. For example, a first content management system installation executes a workflow instance based on a business process application whose definition is maintained in by the first content management system installation and synchronizes a workflow state of the workflow instance to a second content management system installation using a mirrored workflow state in which both content of the workflow state and metadata characterizing parameters of the workflow state are mirrored from the first content management system repository to the second content management system repository such that a content item retained in the second content management system repository is accessed for use in the workflow instance via the mirrored workflow state at the second content management system repository. Methods, systems, and articles of manufacture are described.

17 Claims, 10 Drawing Sheets

HYBRID BUSINESS PROCESS APPLICATION FOR ACCESSING MULTIPLE CONTENT MANAGEMENT REPOSITORIES

CROSS-REFERENCE TO RELATED APPLICATION

The current application claims priority under 35 U.S.C. § 119(e) to U.S. provisional application Ser. No. 62/013,942 filed Jun. 18, 2014, the disclosure of which is incorporated herein by reference in its entirety.

TECHNICAL FIELD

The subject matter described herein relates generally to business process applications and, in some more specific implementations, to business process applications usable in conjunction with a content management system and a content management system repository.

BACKGROUND

Business process models are used by a variety of enterprises to represent processes of the enterprise, for example to facilitate analysis and improvement of a current version of the process. Business analysts and managers of an enterprise can typically develop business process models, often with an objective of standardizing and improving how various business-related tasks are performed within the organization. Business process models can further be used in developing business process applications or other computer-based guides that workers within the enterprise can use in the course of the enterprise's business. An "enterprise" can generally refer to an organization, such as for example a business or company, a foundation, a university, or the like, and can have content requirements related to one or more business processes, content uses, etc.

In addition to management of business processes, a typical enterprise also invests significant effort in enterprise content management (ECM), which covers a broad range of applications, including document management (DM), Web content management (WCM), records management (RM), digital asset management (DAM), search of managed content, and the like. A content management system (CMS) suitable for managing the various content items (also referred to herein in some examples as "files" or "documents") that an enterprise produces or receives, retains or otherwise stores, manipulates or modifies, etc. can support the requirements of one or more of such applications, and optionally other requirements, to provide a coherent solution in which content and management processes are capable of accessing content across a variety of applications subject to access controls, permissions, and the like. Content items managed by a CMS can include one or more of documents, images, photos, Web pages, records, XML documents, other unstructured or semi-structured files, etc., as well as directory structures such as folders, file trees, file plans, or the like, which can provide organization for multiple content items in addition to storing or otherwise representing relationships between content items, etc.

A CMS can manage one or more of the actual digital content of a content item, the metadata that describes a context of the content item, associations between the content item and other content or content items, a place and classification of the content item in a repository, indexes for finding and accessing content items, etc. The CMS can also manage processes and lifecycles of content items to ensure that this information is correct. The CMS can also manage one or more workflows for capturing, manipulating, editing, storing, and distributing content items, as well as the lifecycle for how long a content item will be retained and what happens after that retention period.

A CMS for use in enterprise content management can include one or more of document management tools, applications, and interfaces to support general office work, search, and discovery. Workflow management capabilities of a CMS can support various business processes, optionally including, but not limited to, case management and review and approval. Collaboration applications and services of a CMS can support the collaborative development of information and knowledge in the creation and refinement of content and documents. Web content management services of a CMS, which can be scalable, can support the delivery and deployment of content from the enterprise to its customers. Records management capabilities of a CMS can capture and preserve records based upon government-approved or other standards. A standards-based platform can also provide access to applications that use these standards, such as publishing, image management, email management, etc.

SUMMARY

As discussed in greater detail below, features of the current subject matter can relate to business process applications, in particular to hybrid, configurable business process applications used in conjunction with features of a CMS.

In one aspect, a method includes a first content management system installation executing a workflow instance based on a business process application whose definition is maintained in a first content management system repository that is part of the first content management system installation. The method also includes synchronizing a workflow state of the workflow instance to a second content management system installation that includes a second content management system repository. The synchronizing includes use of a mirrored workflow state in which both content of the workflow state and metadata characterizing parameters of the workflow state are mirrored from the first content management system repository to the second content management system repository. A content item retained in the second content management system repository is accessed for use in the workflow instance via the mirrored workflow state at the second content management system repository.

In some variations, one or more of the following features can be included in any feasible combination. The second content management system repository can be implemented on an on-premise computing system and protected by a firewall, and the first content management system repository can be cloud-based and not firewall-protected. The content item can be kept continuously protected by the firewall during the accessing of the content item by the mirrored workflow state. The workflow instance can include at least one other workflow state that is not mirrored to the second content management repository. Operation of the workflow instance can proceed as though the workflow instance were being handled entirely by the first content management system installation, and wherein the first content management system repository maintains a complete set of case data relating to the workflow instance. The synchronizing can include a synchronization service creating a workflow state synchronization set (that can include service tasks, actions, metadata, and/or workflow exceptions relating to the workflow state) for the workflow state. The workflow state synchronization set can define a workflow state pair that includes the workflow state at the first content management system, the mirrored workflow state at the second content management system, and a communication channel between them. The workflow state synchronization set can push information relevant to execution of tasks of the workflow state to the second content management system installation from the first content management system installation and can pull information relevant to execution of tasks of the workflow state performed at the second content management system installation back to the first content management system installation.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise resource management system, content management software system, or other business software solution or architecture, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Figure 1:
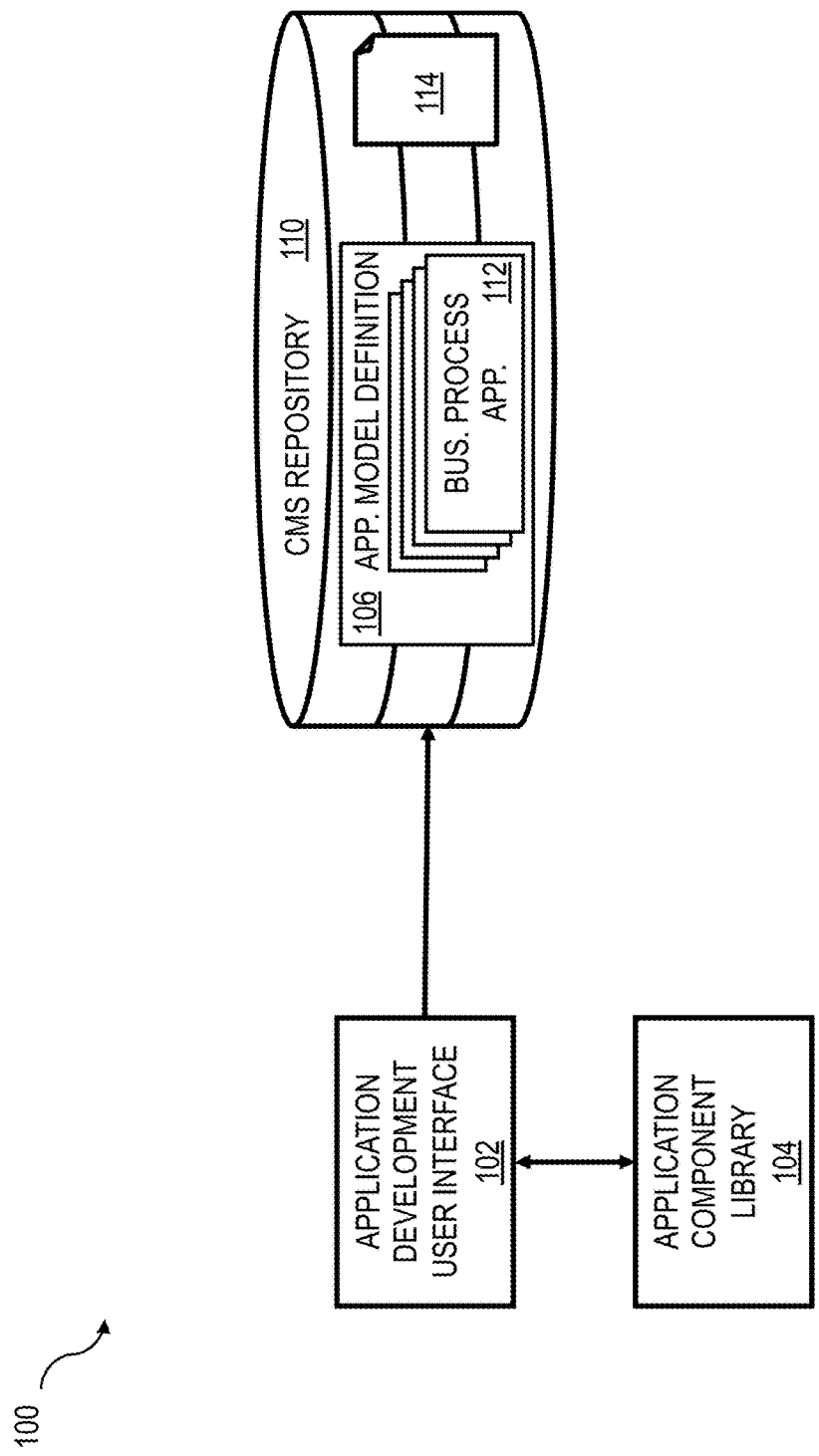
FIG. 1 shows a diagram illustrating features of an example application model definition creation framework consistent with implementations of the current subject matter.

Consistent with some aspects of the current subject matter, one or more dynamically configurable business process applications (also referred to as BPAs) can be supported within an installation of a CMS. As referred to herein, a business process application can be based on an application model definition (also referred to as an AMD), which can define functionality for guiding one or more users through a set of actions consistent with completion of an instance of a business process (or other structured arrangement of activities, tasks, etc.). The set of actions can include either or both of tasks requiring interactions of one or more human users of a CMS and automated actions (e.g. actions performed by a system without direct human interaction). A business process application can be used multiple times for discrete "workflow instances" (also referred to as "execution instances") of a business process or part of a business process supported by the business process application.

Dynamically configurable, customizable business process applications such as those discussed herein can guide workflow instances based on a current context of one or more users, documents (or other content items), systems, etc. This guidance can be provided via a user-interface defined by the business process application being executed as part of a workflow instance, which can in turn be part of a case. As discussed in greater detail below, a business process application can optionally be initially configured using an application development user interface (ADUI), and can itself include user interface features that promote collaboration and information access among multiple users involved in a content management-based business process. Some variations of the current subject matter include hybrid business process applications, which can be configured to execute from one CMS installation while being able to access content on a second CMS installation, even if the second CMS installation is behind a firewall. In this way, a business process application can be a Web application, which can access both content maintained at a first, cloud-based CMS repository and content maintained at a second, on-premise CMS repository. Synchronization of workflow actions, content, and case data relating to execution of one or more workflow instances can readily occur between the CMS repositories of the two CMS installations. In other words, user interface-based business process applications can be modified based on suggestions derived from previous BP instances, content-specific events driving workflow states.

An application model definition can be constructed using an application development user interface, such as for example an application development user interface having one or more of the features further discussed below. An application model definition can serve as a modeled framework for one or more business process application variations. For example, an application model definition can be directed to a business process for content creation, modification, approval, and execution, such as a business process relating to generation, revision, review, signing, archiving, etc. of a contract. Other examples of application model definitions can include collaboration applications, records management applications, and the like.

A business process application based on an application model definition can be defined with greater specificity to tailor the business process application to reflect details of one or more business processes specific to a sub-organization of the enterprise (e.g. a legal department, a human resources department, etc.) or to some other organization, for a different specific purpose, etc. As used herein, a business process application refers to an variation, version, instance, etc. of an application model (defined by an application model definition), which can be further refined or defined based on one or more expected use criteria, such as for example a target audience that will use the business process application, a specific set of custom actions related to tailoring the business process application to a target use, or the like. As an example, the contracts application model discussed above can be deployed as a legal contracts business process application, a human resources contracts business process application, a real estate contract business process application, or the like. As discussed further below, a business process application can also be dynamically configurable such that user actions in response to guidance provided by the business process application during a workflow instance based on the business process application can deviate from the guided or recommended actions as defined in the business process application. Such user actions can also impact guidance provided by the business process application in the course of subsequent workflow instances based on the business process application. In some examples, a user can save a modified or new business process application based on updated or altered guidance developed at least in part based on case data retained for one or more past workflow instances.

As used herein, a workflow instance refers to a specific instance or iteration of a set of actions guided by a business process application for a specific document or set of documents. As an example, for a business process application related to contract review, the review of a contract or a set of related contracts can constitute a workflow instance of the business process application.

FIG. 1 shows a diagram 100 illustrating components of an application model definition creation framework consistent with implementations of the current subject matter. In a design-time mode, a business analyst or other user who understands the business needs of an enterprise, but who need not be an expert programmer, uses an application development user interface 102. The application development user interface 102 accesses an application component library 104, which can include a selection of application building blocks (e.g. preconfigured model components) that can be combined, assembled, and optionally modified into an application model definition via a visual interface (e.g. a "drag and drop" user interface or other graphical user interface) without requiring that the user have coding expertise or even a knowledge of the programming concepts underlying the functionality of the application building blocks. The application building blocks can include configurable modules representative of one or more process model elements, such as for example those discussed in further detail below. Examples of such application building blocks can include user interface modules, executable components, pre-defined services, or the like that relate to one or more sets of customizable application model frameworks defined for a CMS installation.

While the use of an application development user interface 102 that utilizes a set of application building blocks stored in an application component library 104 can provide various advantages in terms of ease of use, reduced user training requirements, etc., it will be understood that other approaches to creating an application model definition 106 are also within the scope of some implementations of the current subject matter. A created application model definition 106 can be stored in a repository, which can optionally be a CMS repository 110 of a CMS installation. It will also be understood that reference in the discussions of the drawings and example implementations of the current subject matter to various repositories is intended to include any combination of database structures, possible including a single database at a single computing device, multiple databases at a single computing device, a single database distributed across multiple computing devices, multiple databases distributed across multiple computing devices, and the like.

As noted above, the application model definition 106 can serve as the basis for one or more business process applications 112, which can also be stored in the CMS repository 110. It will further be understood that discussions herein referring generally to "a CMS repository" are not intended to require that a single repository retain all of the content discussed. For example, it is also within the scope of one or more implementations of the current subject matter to include a CMS repository 110 for maintaining and managing content of an organization and also to maintain one or more separate repositories specifically for maintaining application model definitions 106, business process applications 112, etc. relevant to the organization. It will also be understood that use of an application component library 104 is not a requirement for generating an application model consistent with the current subject matter. application model definitions prepared using other approaches can also be employed.

A CMS-related application model definition 106 can define a series of process model elements and connections between process model elements, which can include sequence flows, gateways, events, tasks, listeners or triggers, references to one or more repository object nodes, and the like. Properties in an application model definition 106 can correspond to one or more variables relevant to a given workflow instance based on that application model definition 106 (e.g. a given workflow instance resulting from execution of a business process application 112 based on or derived from the application model definition 106).

A sequence flow can serve as a connector between two elements of a process, while a gateway can be used to model concurrency in a process and to control the flow of execution. An event models something that happens during the lifetime of a workflow instance, and can include event definitions that define the semantics of an event. Examples of semantics definable by an event definition include, but are not limited to, a time event definition, an event type definition, an error event definition, a signal event definition, a message event definition, etc. In some variations, an event does not require a definition. For example, a start event can occur without further defined actions simply when a workflow instance owner initiates an instance of the business process.

Tasks can include user tasks, which typically require that a human actor perform an action, and script tasks (also referred to as automated tasks), which are executed automatically upon being reached during execution of a process instance. A script task can be configurable to determine an action to automatically execute based on one or more variables, potentially including but not limited to variables characterizing a current document state, a change to a document state, a user, a reviewer, an initiator or owner of the process instance, metadata associated with a document or with a current instance of the business process, etc. Examples of user tasks include required user inputs, reviewing and approving/rejecting a document, etc. A task model can provide a task description of a task in a business process model. A task description can include a name or title for the task, properties and/or associations (e.g. information attached to the task). The description can drive a user interface dialog for viewing and managing a task. A data dictionary can describe types of objects to store, view, and edit.

A repository object node can be an object-oriented view of one or more content items 114 in a CMS repository 110. A CMS repository 110 can include functionality for retrieving and setting properties, traversing associations between content items, and performing actions relating to content management, such as for example check-in, check-out, and transformations (e.g. edit, revise, delete, etc.) relating to one or more content items maintained by a CMS repository.

Listeners, which can also be referred to as triggers, trigger points, or the like, can implement hook points inside an application model definition 106 (and a business process application 112 based on the application model definition 106), which are triggered by events during execution of a workflow instance. A task listener executes (optionally, Java) logic or another executable expression upon the occurrence of a specified task-related event. An execution listener executes external (optionally, Java) code or evaluates an expression when certain events occur during process execution.

Figure 2:
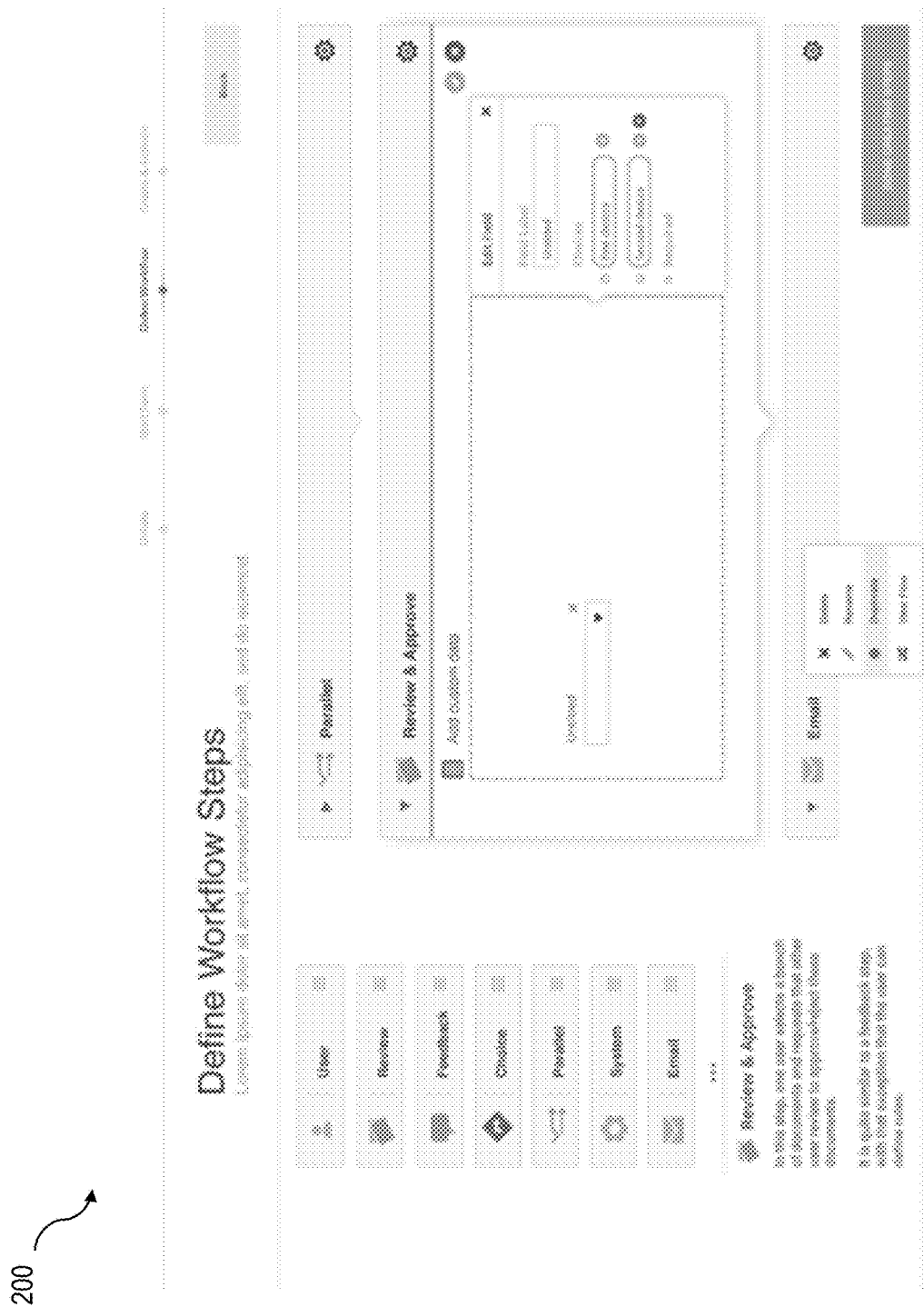
FIG. 2 shows a screenshot view illustrating feature of an example application development user interface consistent with implementations of the current subject matter.

FIG. 2 shows a screenshot view 200 illustrating features that can be included in an application development user interface 102 consistent with implementations of the current subject matter. An application model definition template 202 can be used to define process model elements to be included in the application model definition 106 for handling the various workflow process steps that may occur in an in workflow instance of a business process application 112 based on the application model definition 106. Included process model elements can be further edited, refined, etc. to provide a desired pre-defined workflow sequence for business process applications 112 based on the application model definition 106. This pre-defined workflow sequence is provided as guidance during workflow instances occurring during execution of one of the business process applications 112. An application development user interface 102 having one or more features in common with those shown in FIG. 2 can also be used to modify an existing application model definition 106 or to define a new application model definition 106 based on an existing application model definition, for example to create an updated version of an application model definition, to review and implement possible changes to an application model definition, etc.

As noted above, one example of an application model definition 106 that can be generated consistent with implementations of the current subject matter is a contracts business process application designed to guide users through a business process relating to generation, review, and approval of a contract. Such an application model definition 106 can include features such as lifecycle phases of a contract, which can include one or more of a proposal phase, an internal approval phase, an external negotiation phase, an execution or signature phase, a publishing phase, etc. Each lifecycle phase can have associated tools, roles, permissions, rules, etc., which can be reflected in the guidance provided by a business process application 112 based on the application model definition 106 to an end user during runtime execution of the BPS 112 as part of a workflow instance. The application model definition 106 can be stored in the CMS repository 110, or alternatively in another repository. As an example, a contract "review and approve" application model can include within its application model definition 106 one or more criteria for moving a case from one lifecycle phase to another as well as user interface features to prompt users whose actions are required. The application model definition 106 can also include metadata about the application model.

Figure 3:
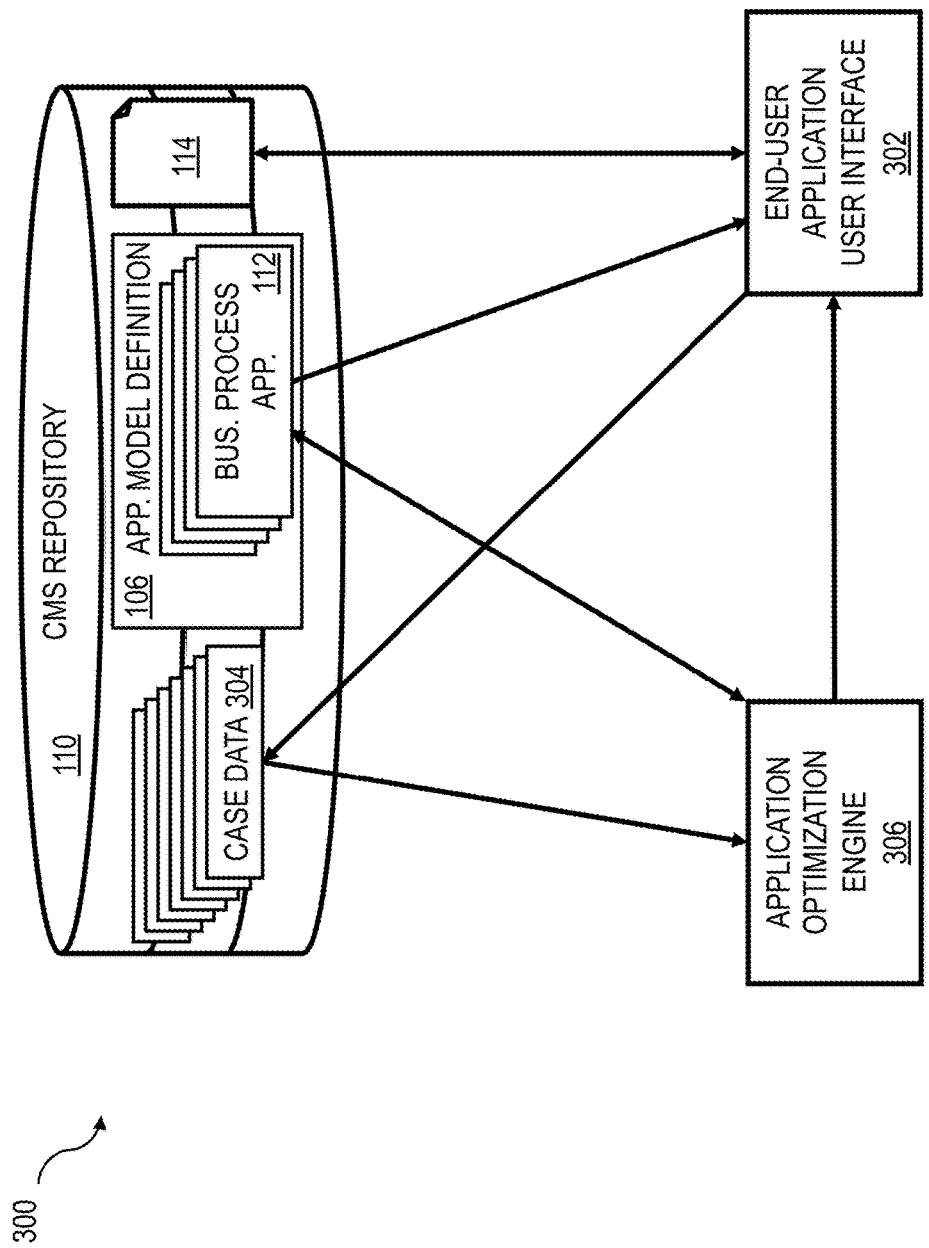
FIG. 3 shows a diagram illustrating features of an example runtime framework for configurable business process applications consistent with implementations of the current subject matter.

FIG. 3 shows a diagram 300 illustrating content management system components that can be invoked as part of a runtime execution of a workflow instance of a business process application 112. During runtime, an end-user application user interface 302, which can be defined at least in part by the application model definition 106 and optionally further defined by a specific business process application 112 as well as by an owner or initiator of a specific workflow instance, enables a user of the business process application 112 to execute features of a workflow relating to a specific case associated with the business process application 112. The term "case" is used herein to refer generally to the actual procedures, actions, etc. that occur during the processing of one or more workflow instances of one or more business process applications 112 related to completion of a business process. A case can relate to a specific content item 310 or set of content items managed by the CMS and maintained in one or more CMS repositories 110. Furthermore, a case can be considered as a container or "wrapper" for metadata, content items, and one or more workflows relating to completion of the case. For example, processing of a first contract according to a business process application 112 based on an application model definition 106 can be part of a first case and processing of a second contract according to that business process application 112 or some other business process application 112 based on the contract application model can be part of a second case. A case can optionally include multiple workflow instances (execution of which can be based on one or more business process applications 112 derived from one or more application model definitions 106), multiple content items 114, and the like as noted above.

When a user performs an action in the course of a workflow instance as part of a case using the end-user application user interface 302, the business process application 112 upon which the workflow instance is based can provide guidance to users regarding suggested process features (e.g. steps, actions, sub-steps, other users, etc.) for completion of that action or some other action involved in the workflow instance. In a contract example, a user starts a new contract or continues processing of an existing contract using guidance provided by the business process application 112. The guidance provided by the business process application 112 is flexible in that a user can be allowed to deviate from a next recommended action. For example, when the business process application 112 guides the user to direct a contract review sub-process to a second user having a review role, the user is allowed to instead direct the contract review to a third user, perhaps because the third user has specific expertise related to the particular contract involved in the current case.

Such a deviation from the guidance provided by the business process application 112 during a workflow instance as part of a case can be generally referred to as an exception. In some examples, a decision to institute an exception can be made only by an owner or initiator of a workflow instance (e.g. a user who has responsibility for or who begins a workflow instance). In other options, one or more other users can be allowed to institute exceptions. The owner or initiator of the workflow instance can optionally retain the ability to designate users allowed to make exceptions. Alternatively or in addition, permissions to institute exceptions can be assigned automatically based on a user role (e.g. manager, supervisor, etc.) and/or one or more other criteria, which can be included as part of the application model definition 106 upon which the business process application 112 is based or alternatively within the definition of a business process application 112 itself. The application optimization engine 302 can also make recommendations for users and/or user roles to be allowed permissions to institute exceptions. This and other possible functions of the application optimization engine 302 can be supported by retention and analysis of case data 304 for currently and previously executed workflow instances based on business process applications 112 and application model definitions 106 available to users of the CMS repository 110.

For each case, case data 304 can be stored, for example in the CMS repository 110 or optionally in one or more other repositories. The case data 304 stored for each case can include an identifier of the specific business process application 112 (or, optionally, multiple business process applications 112) used in processing the case as well as any exceptions that were made relative to a business process application 112 in processing the case. In addition, other historical data or artifacts can be included in the case data set 304, such as for example an amount of time required for one or more actions or features of a workflow instances involved in the case to be completed, a total time between initiation of the case and completion of the case (or between two actions within a workflow instance, etc.), a number of review iterations, one or more quality metrics relating to the end product or products of the case, users or roles that participated in completion of the case, etc. For a case in which one or more exceptions were invoked in completion of a workflow instance based on a business process application 112, a user can be prompted to save a revised or modified definition of the business process application 112.

An application optimization engine 306 or other comparable or equivalent functionality can access the case data 304 in the case CMS repository 110 and can perform one or more of a variety of tasks related to optimizing workflow performance. For example, the application optimization engine 306 can compare definitions of different business process applications 112 based a common application model definition 106 and can make recommendations for improvements. One or more metrics relating to completion of workflow instances based on a business process application 112, such as for example completion times, occurrences of errors, etc., can be determined using the case data 304 from cases for which one or more actions were performed based on the particular business process application 112.

The application optimization engine 306 can optionally identify patterns in usage of an application model definition 106 or a specific business process application 112, and can define a new business process application 112 based on these patterns. In this manner, a user need not consciously or intentionally create a new business process application 112. Instead, the combined actions of one or more users completing multiple workflow instances based on one or more existing business process applications 112 can be used to extract a definition of a new business process application 112 that may be more efficient or that otherwise better reflects how actual users perform actions, tasks, etc. The collective intuition, expertise, thought processes, etc. of users processing cases based on the guidance of one or more business process applications 112 can thereby be incorporated into improved new or modified business process applications.

The application optimization engine 306 can also make use of the case data 304 to provide solicited or unsolicited advice to a user executing a workflow instance as part of a current case. In other words, historical case data 304 can be analyzed by the application optimization engine 306 to provide dynamic feedback, advice, improved recommendations, etc. to a user executing workflow instance of a business process application 112 as part of a current case.

A business process analyst, a manager, or the like who creates an application model definition 106, and optionally one or more business process applications 112 based on the application model definition 106, generally has detailed knowledge and insight into a framework, context, etc. for execution of a business process or other set of tasks or the like involved in processing one or more content items as part of a case. However, day to day end users of a business process application 112 may provide more relevant, more timely, and ultimately more useful information. In an illustrative example, an end user executing a runtime workflow instance based on a business process application 112 for a specific contract might note that the contract includes a large amount of technical information. The end user could invoke an exception to designate the contract, or at least the parts of the contract having key technical content, for further review by one or more technical staff members instead of following the guidance of the business process application 112, which recommends review by a manager or other person or role to whom most contracts are directed for approval. This exception is recorded in the case data 304, which can include a variety of data, metadata, etc. relating to the case, as well as to content items, users, workflow instances, etc. associated with the case. Such data and/or metadata can include, but are not limited to, a sequence of operations and actions occurring during completion of actions involving the case, identities and roles of users participating in workflow instances that are associated with the case, and the like.

In addition to the case data 304 discussed above, which can be retained automatically, the application optimization engine 306 can optionally request from the user additional information about the rationale underlying an exception. For example, if a user causes an exception from the guided or recommended actions defined within the business process application 112 being executed as part of a workflow instance, the application optimization engine 306 can optionally cause the end-user application user interface 302 to display a prompt requesting further input regarding the exception. Such further input can include, but is not limited to, a free text explanation, responses to one or more questions presented to the user (e.g. with a selection of suggested answers, etc.), or the like. Any received user responses can be saved as part of the case data 304 relating to the case with which the current workflow instance is associated.

Historical case data (e.g. case data 304 stored for previously executed workflow instances) can be used to generate recommendations for suggested exceptions to a business process application 112 for a given workflow instance. For example, if a contracts business process application 112 is being used as the framework for a workflow instance relating to a contract involving a customer located in an unfamiliar territory (e.g. a location differing based on one or more criteria from locations where most customers of an organization do business), the application optimization engine 306 can provide a recommendation for further review, advice against completing a transaction involved in the workflow instance without receiving further assurances (e.g. an escrow payment or the like), etc.

Figure 4:
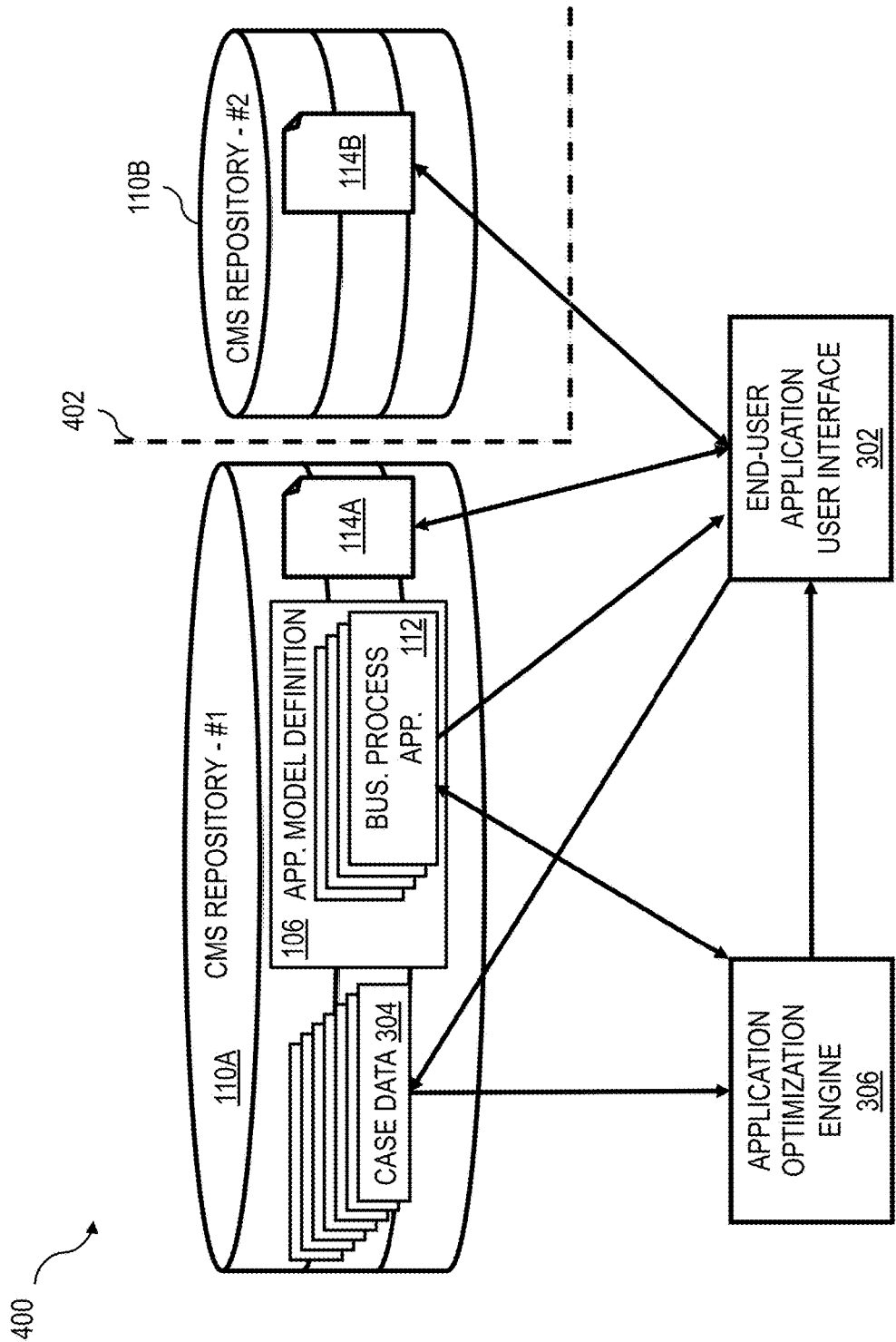
FIG. 4 shows a diagram illustrating features of an example runtime framework for configurable hybrid business process applications consistent with implementations of the current subject matter.

FIG. 4 shows a diagram 400 illustrating additional features that can be implemented in one or more variations of the approach discussed above. As shown in FIG. 4, the end user application user interface 302 can access content items 114A, 114B in multiple CMS repositories 110A, 110B. At least one of the CMS repositories 110A can be protected by a firewall 404 interposed between a domain within which the workflow instance of a business process application 112 is executed and the second CMS repository 110B.

In one example configuration, a first CMS repository 110A can be associated with a cloud-based installation of a content management system and a second CMS repository 110B can be associated with an on-premise installation of the content management system that is protected by the firewall 402. The business process application 112 supporting the end user application user interface 302 can be provided as a cloud-based Web application executing in a domain that is external to the firewall 402. In a conventional approach, a browser operating such a Web application would not allow the Web application to make a behind the scenes call to access content held in a repository at a different domain (e.g. the second CMS repository 110B protected behind the firewall 402). This issue can be addressed by including the ability within the business process application 112 to enable a browser to mediate access to multiple domains without throwing an exception.

In one approach consistent with this capability, a service application programming interface (API) can be provided by the CMS installations maintaining both of the first CMS repository 110A and the second CMS repository 110B such that the business process application 112 hosted on the CMS installation maintaining the first CMS repository 110A can talk to both APIs from the browser executing the business process application 112 as part of a hybrid workflow instance.

In another approach that is also within the current scope, a cross-origin resource sharing (CORS) mechanism can be used. A CORS mechanism can allow multiple resources (e.g. content items, metadata, additional workflows based on other business process applications 112, etc.) to be requested from another domain outside the domain from which the currently executing business process application 112 originated. In other words, a business process application 112 hosted by the first CMS installation maintaining the first CMS repository 110A can be capable of accessing content and the like from the second CMS installation maintaining the second CMS repository 110B, despite the presence of an intervening firewall that would otherwise prevent such access. In some examples, an AJAX (asynchronous JavaScript and XML) call from a JavaScript-based business process application 112 can use the XMLHttpRequest mechanism to accomplish this access. Other approaches for allowing a business process application 112 executing within a first CMS installation to access, manipulate, and synchronize content 114B, metadata, case data, etc. maintained by a second CMS repository 110B of a second CMS installation despite the presence of an intervening firewall are also within the scope of the current subject matter.

Figure 5:
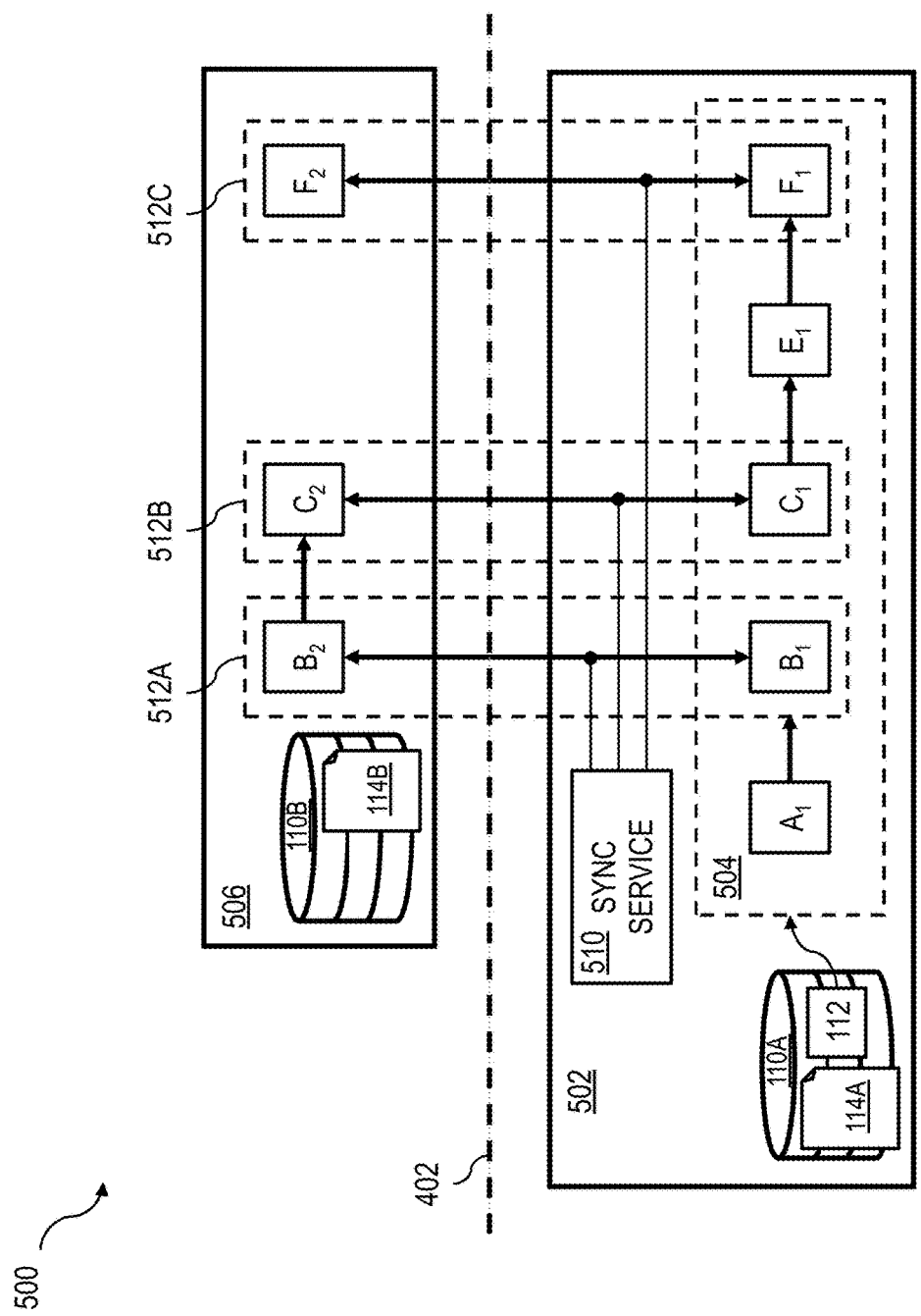
FIG. 5 shows a diagram illustrating operation of a hybrid business process application with synchronization of workflow states between a first and a second CMS installation.

FIG. 5 shows a diagram 500 illustrating an example of a hybrid business process application approach consistent with implementations of the current subject matter. A first CMS installation 502, which includes a first CMS repository 110A, executes a workflow instance 504 based on a business process application 112 whose definition is maintained in the first CMS repository 110A. The workflow instance 502 in this example includes workflow states A, B, C, D, E, and F. For example, the workflow state $A_1$ can be an initiation state, which can include designation of content items relevant to the workflow instance 502, assigned users (e.g. content reviewers, approvers, creators, etc.). The workflow state $B_1$ in this example requires access to a content item 114B retained on a second CMS repository 110B managed by a second CMS installation 506. Accordingly, a synchronization is required between the workflow state $B_1$ and a corresponding workflow state $B_2$ at the second CMS installation 506.

In some examples, a synchronization of the content item 114B between the second CMS repository 110B and the first CMS repository 110A can be completed such that a copy or mirrored version of the content item 114B is created at the first CMS repository 110A, operated on by the workflow instance 502, and then synchronized with the content item 114B at the second CMS repository 110B. However, in a hybrid business process application environment, particularly one in which a cloud-based business process application 112 requires operations on a content item 114B stored behind a firewall 402, it can be advantageous to avoid exposing the content item 114B by synchronizing a copy of it to the first CMS repository 110A of the non-firewall protected first CMS installation 502. Implementations of the current subject matter can permit a business process application 112 operating external to a firewall 402 to manage workflow states affecting inside the firewall content items as part of a workflow instance 504.

Rather than synchronizing the content item 114B from the second CMS repository 110B to the first CMS repository, one or more workflow states (in the example shown in FIG. 5, this would be workflow states $B_1$, $C_1$, and $F_1$) of the workflow instance 502 are synchronized to the second CMS installation 506 (e.g. as workflow states $B_2$, $C_2$, and $F_2$). Synchronization of workflow states can be handled by mirroring both content (e.g. data) of a workflow state and metadata characterizing aspects, features, status, context, etc. of the workflow state to the second CMS repository 110B such that operation of the workflow instance 504 proceeds as though the workflow instance 502 were being handled entirely by the first CMS installation 502. A communication channel implemented by a synchronization service 510 can synchronize one or more workflow states of the workflow instance 504. This functionality can include the synchronization service 510 creating one or more workflow state synchronization sets 512B, 512C, 512F to synchronize service tasks, actions, metadata, workflow exceptions, etc. relating to each workflow state. As illustrated in FIG. 5, each workflow state has its own workflow state synchronization set. However, it will be understood that a single synchronization set can include multiple workflow states of a workflow instance. As a consequence of synchronizing the above-noted information about the workflow states of a workflow instance, the first CMS repository can maintain a complete set of case data relating to the workflow instance, despite some of the workflow states being handled at the second CMS repository. Optionally, one or more security settings can restrict the type of case data that are synchronized back to the first CMS repository 110A across the firewall 402.

Further with reference to FIG. 5, a workflow state synchronization set (e.g. workflow state synchronization set 512B) can define a workflow state pair that includes the first CMS installation workflow state $B_1$ and the associated second CMS installation workflow state $B_2$ as well as the communication channel between them. Via a workflow state synchronization set, service tasks, actions, metadata, workflow exceptions, etc. relating to the workflow state are exchanged between the first and second CMS installations 502, 506. In the example where the workflow instance 502 of the business process application 112 executes at the first CMS installation 502 (e.g. as shown in FIG. 5), each synchronization set 512B (or 512C, 512F, etc.) can push information relevant to the corresponding workflow state to the second CMS installation 506 and also pull relevant information relating to execution of tasks associated with the corresponding workflow state back to the first CMS repository 110A. In some examples, aspects can be associated with workflow states, content items involved in execution of a workflow instance 502 or related to a business process application 112, etc., and these aspects can be used for identifying the information about a workflow state that should be included in its corresponding synchronization set. As used herein, "aspect" refers to a piece of metadata that is part of the metadata definition for each of the documents, files and/or other content. The aspect identifies the documents, files or other content (and associated metadata) that relate to the workflow instance. Furthermore, an aspect allows workflow states to be shared between the first CMS installation 502 and the second CMS installation via the synchronization service.

Alternatively, despite the first CMS installation 502 managing the workflow instance 502, the exchange of synchronization set information can be managed for one or more of the workflow states from the second, firewall-protected CMS installation 506 such that information is pushed and pulled under control of the second CMS installation 506 instead of the first CMS installation 502. Such an approach can include the synchronization service 510 sending a request for a pull or push of information to the second CMS installation 506 and the second CMS installation 506 then acting in response to the request, optionally after running one or more authorization or permissions checks, etc. or implementing other data security measures commensurate with the requirements of the firewall 402.

Consistent with the descriptions above, a cloud-based business process application 112 can access content in both of a firewall-protected enterprise content management system (e.g. a second CMS installation 506 managing the second CMS repository 110B) and a cloud-based installation of a CMS (e.g. a first CMS installation 502 managing the first CMS repository 110A). In a further implementation of the current subject matter, a workflow instance based on a business process application 112 can be synchronized between first and second CMS repositories 110A, 110B, by partitioning, distribution, and isolation of workflow components as part of a hybrid workflow instance. Content and metadata associated with the content 114A that are processed in parts of the workflow instance associated with a first CMS installation maintaining the first CMS repository 110A are synchronized with a mirrored version of the content 114B and metadata that are processed in the parts of the workflow instance associated with a second CMS installation maintaining the second CMS repository 110B, leveraging a synchronization mechanism, as described in further detail below.

Both document content and workflow instance actions can optionally be consistently atomic. For example, when a document (or other content) is updated in a workflow instance parts involving the first CMS repository 110A and these workflow instance parts are finished, the mirrored version 114B of the document (or other content) can be synchronized with the first CMS repository version of the content 114A before the parts of the workflow instance involving the second CMS repository continue 'flowing' or are otherwise resumed, such that the latest version is always available to users in either of the first CMS repository 110A and the second CMS repository 110B.

In this manner, a unified instance of an application model can support application model instances that are capable of accessing content items 114A, 114B maintained in repositories existing in different domains. This capability can further enable the use of metadata associated with content items to indicate whether a specific content item is approved for access via a cloud-based repository or, alternatively, if the specific content item should be required to be retained at the on-premise repository. If the metadata of a content item precludes that content item from being accessible outside of the firewall, other approaches to synchronizing the content item between the two CMS repositories 110A, 110B may not be permissible. Features consistent with the current subject matter can permit an application instance to access both types of content items in a unified manner. For example, the application instance might be allowed to access a content item 114B within the firewall-protected second CMS repository 110B, to modify the content item 114B, and save the content item 114B to the firewall-protected CMS repository 110B without necessitating that the content item 114B ever be accessible outside of the firewall 402.

Figure 6:
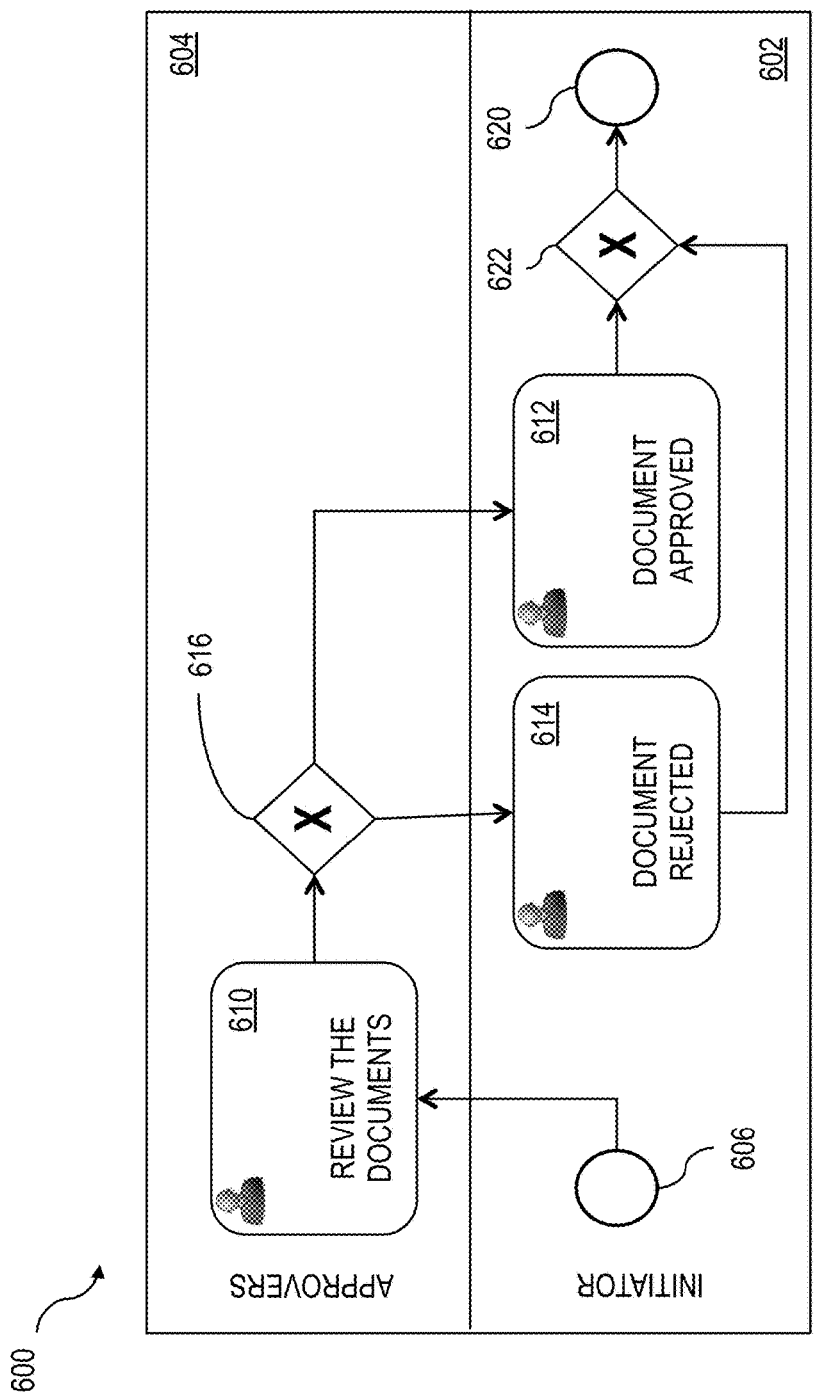
FIG. 6 shows a diagram illustrating an example workflow instance based on a business process application consistent with implementations of the current subject matter.

As noted above, implementations of the current subject matter can include configurable business process applications, which can be flexible both in allowing definition of tasks, actions, etc. to be performed for any given workflow instance based on the business process application 112, but also in using historical data from workflow instances involving the same and/or other users to permit improvements or other modifications of a business process application 112. FIG. 6 shows a diagram 600 illustrating workflow states of a business process application. The business process application can include an initiation point as well as other elements, such as user input requests, decision or branching points (referred to herein as branching points), and process termination points. The business process application depicted in FIG. 6 includes "review and approve" features, in which input (e.g. approval or rejection, etc.) in requested from of one or more reviewers of one or more documents. The application model definition 106 underlying the business process application 112 illustrated in FIG. 6 can be constructed using one or more of a variety of approaches, such as for example the application development user interface 104 discussed above in relation to FIG. 1, and can include a first set 602 of elements that are performed by an owner or initiator of a specific workflow instance resulting from execution of the business process application as part of a case as well as a second set 604 of elements performed by other users (in this case, approvers). The illustrated business process application includes initiation at 606, for example by the owner of a workflow instance resulting from execution of the business process application. An instance owner can be, for example, a person, a role, or the like who initiates or causes the workflow instance to be initiated. Alternatively, an instance owner can be someone who directs initiation of the workflow instance. Initiation 606 can optionally include requesting and/or receiving input from the owner or other process initiator, for example via a user interface form. The input can include a selection by the instance owner of documents as well as people or roles that are to be involved in the workflow instance. In the example of FIG. 6, after initiation at 606, an approval sub-process requests review and approval of one or more documents by one or more reviewers 610. The one or more documents are approved 612 or rejected 614 at a branching point 616, and the business process terminates at 620 after passing another branching point 622.

Figure 7:
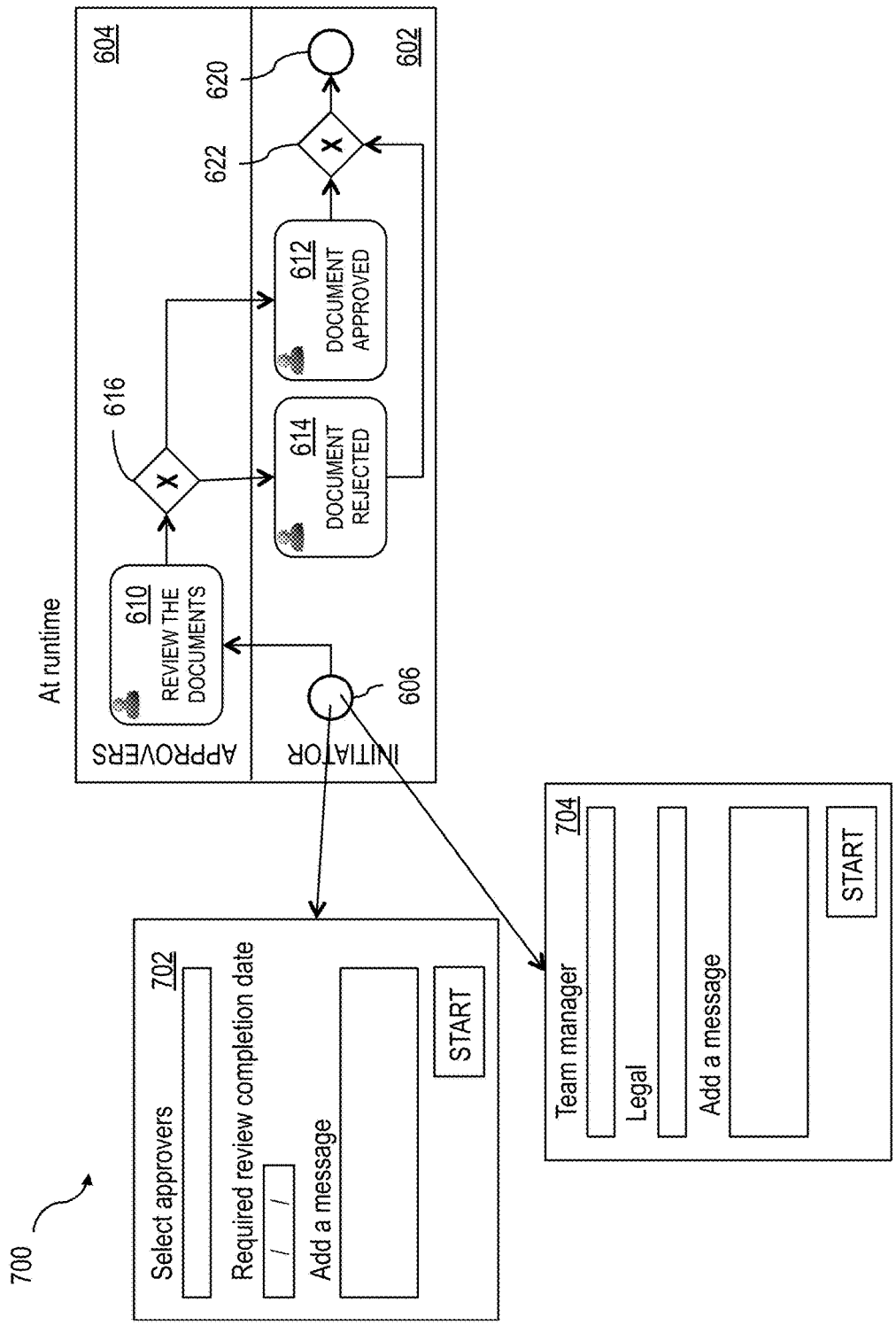
FIG. 7, FIG. 8, and FIG. 9 show examples of user interface screens that can be associated with different roles and parts of a workflow instance based on a business process application consistent with implementations of the current subject matter.

FIG. 7 shows a diagram 700 illustrating different user interface options that can be presented to an owner or initiator of a workflow instance based on a business process application consistent with implementations of the current subject matter. A start form user interface screen 702 can be presented to the initiator upon creation or initiation of a workflow instance based on a business process application. It will be understood that references to a user interface screen are intended to broadly refer to any type of user interface display, such as for example a window, a pop-up box, a browser tab, a floating text or other input box, or the like, which can be displayed to a user on a screen, a display, a projection, etc. generated by one or more computing devices. The initiator can be prompted for inputs that can optionally include a menu or free text entry box (or the like) for choosing one or more reviewers or other users who will be requested to perform actions as part of the workflow instance. The user interface 702 can also optionally allow input of a target time or date for completion of a review or other process associated with the workflow instance. The initiator can also optionally enter a message, a description, or the like, which can then be presented to other users via user-specific user interface screens.

In some implementations, a start form 704 can be included in addition to or in lieu of the start form 702. In the start form 704, the initiator can designate additional users to fill specified roles. For example, if the underlying business process application for the workflow instance involves activities that require approval from the legal department, or a team manager, specific entries areas can be provided, and these areas can optionally provide prompts with names of one or more users available within the organization fitting the designated role. In further implementations of the current subject matter, the prompts for users or other inputs can be informed by historical case data. For example, entry of a required review completion date that is only a short time in the future can cause an application optimization engine as discussed above (or other comparable functionality) to provide a prompt of potential approvers (optionally meeting one or more additional criteria that can be specified in the underlying business process application upon which the workflow instance is based, defined by an initiator or other user, or the like) who have historically been sufficiently quick in responding to review requests to meet the specified deadline. When the start form or any other user entry form associated with a workflow instance consistent with implementations of the current subject matter provides prompts or suggested user inputs, the application optimization engine can record which of the prompted choices is selected as well as other selections that deviate from the recommendations. Such information can be stored in the case data, and can be used to modify the provided recommendations. Alternatively or in addition, the user interface can optionally request additional explanation from a user who makes a choice that deviates from the provided recommendations.

Figure 8:
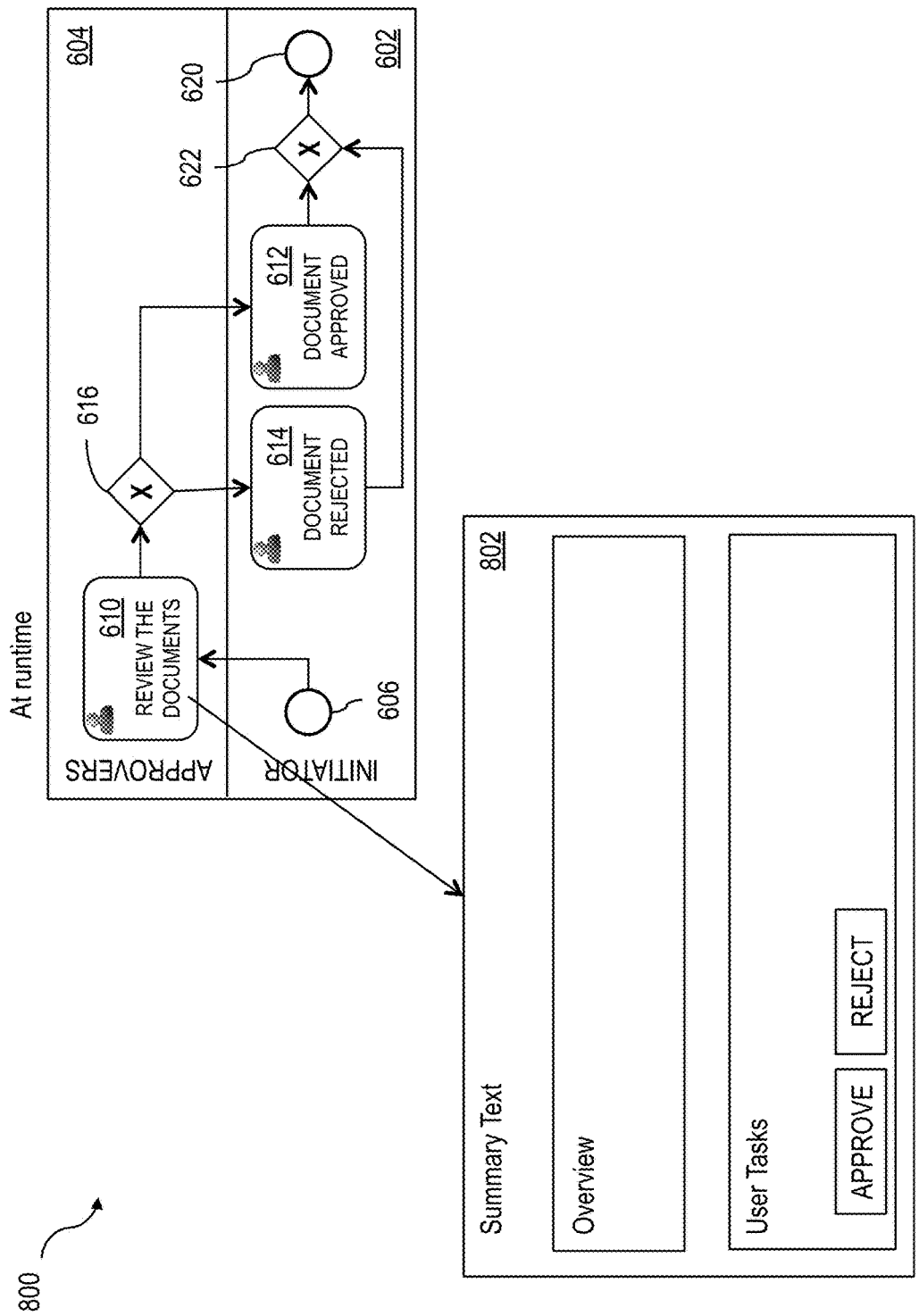

FIG. 8 shows a diagram 800 illustrating an example user interface screen 802 presented to an "approver" user. In this example, the user interface screen 802 can include summary text, which can be based on the "message" entered by the initiator via the user interface screen 702 from FIG. 7 and/or can include target due date information, a characterization of the type of project being undertaken, the type of review needed, etc. An overview pane can give a quick view of which other users involved in completion of the workflow instance have competed tasks or still have additional tasks to complete, etc. A user tasks pane can prompt the specific user to whom the user interface screen 802 is displayed regarding tasks that he or she needs to complete as part of the workflow instance. The type of information displayed to other users can be configurable at one or more of the times of defining an application model definition 106, customizing a business process application 112 based on the application model definition 106, and initiating a workflow instance based on a business process application 112. The user interface screen can also optionally include features such a comments field for a user to communicate information back to the initiator, referral or delegation functionality to allow a user to create an exception by designating a different or additional reviewer, participant, etc. in the workflow instance, or the like.

Figure 9:
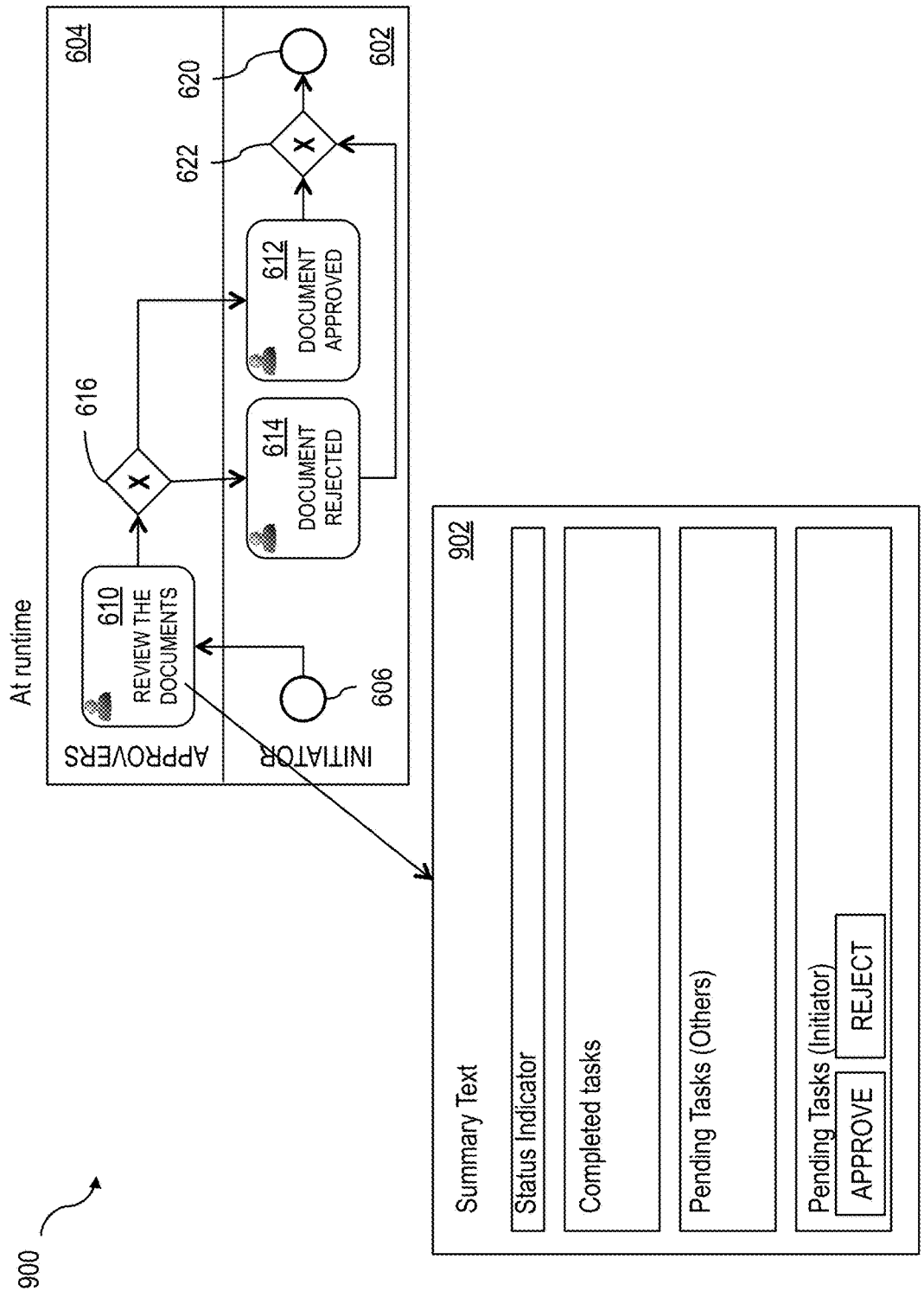

FIG. 9 shows a diagram 900 illustrating an example user interface status screen 902 presented to an initiator of a workflow instance. In this example, the status screen 902 can include a status indicator, which can provide a high level summary of an amount of work completed and an amount of work (e.g. tasks) remaining to be done to complete the current workflow instance. Completed and pending tasks panes can indicate which designated users have completed or are yet to complete assigned actions. A "to do" or personalized pending tasks pane can also be included to indicate to the initiator those tasks that are now available for him or her to complete. If a review is required by the initiator, review/approve buttons (or other user interface elements) can also be included.

Figure 10:
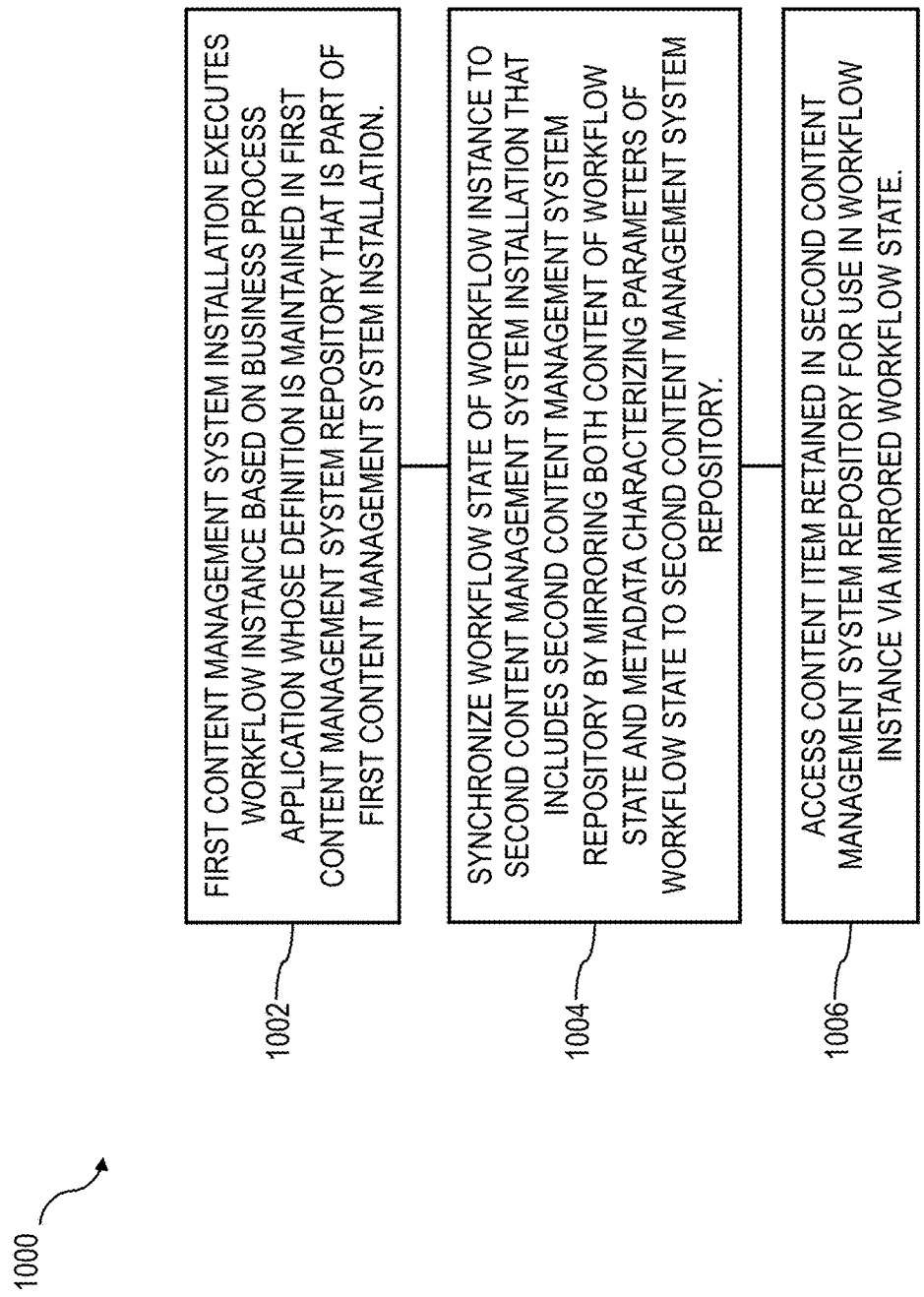
FIG. 10 shows a process flow diagram illustrating aspects of a method having one or more features consistent with implementations of the current subject matter.

FIG. 10 shows a process flow chart 1000 illustrating features of a method consistent with implementations of the current subject matter. At 1002, a first CMS installation executes a workflow instance based on a business process application whose definition is maintained in a first CMS repository that is part of the first CMS installation. At 1004, a workflow state of the workflow instance is synchronized to a second CMS installation that includes a second CMS repository. The synchronizing can include mirroring both content of the workflow state and metadata characterizing one or more parameters of the workflow state to the second CMS repository. At 1006, a content item retained in the first CMS repository is accessed for use in the workflow instance. The accessing occurs via the mirrored workflow state such that operation of the workflow instance proceeds as though the workflow instance were being handled entirely by the second CMS installation (e.g. the content item is never released from control of the second CMS repository, and no copy or second version of the content item is created within the first CMS installation.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer program product comprising a non-transitory machine-readable medium storing instructions that, when executed by at least one programmable processor, cause the at least one programmable processor to perform operations comprising:

executing, by a cloud-based first content management system installation, a workflow instance based on a business process application whose definition is maintained in a first content management system repository, the workflow instance requiring operations on a content item stored in a second content management system repository but not in the first content management system repository, the first content management system installation comprising a synchronization service;

implementing, by the synchronization service, a communication channel between the workflow state of the workflow instance and an associated workflow state of a second content management system installation, the second content management system installation includes the second content management system repository implemented on an on-premise computing system and protected by a firewall;

synchronizing the workflow state of the workflow instance to the associated workflow state of the second content management system installation, the synchronizing comprising exchanging content of the workflow state and metadata characterizing parameters of the workflow state over the communication channel so that the content and metadata are mirrored from the first content management system repository to the second content management system repository; and accessing a content item retained in the second content management system repository for use in the workflow instance via the mirrored associated workflow state at the second content management system repository.

2. A computer program product as in claim 1, wherein the operations further comprise keeping the content item continuously protected by the firewall during the accessing of the content item by the mirrored associated workflow state.

3. A computer program product as in claim 1, wherein the workflow instance comprises at least one other workflow state that is not mirrored to the second content management repository.

4. A computer program product as in claim 1, wherein the operations further comprise: proceeding with operation of the workflow instance as though the workflow instance were being handled entirely by the first content management system installation, and wherein the first content management system repository maintains a complete set of case data relating to the workflow instance.

5. A computer program product as in claim 1, wherein the synchronizing comprises the synchronization service creating a workflow state synchronization set for the workflow state, the workflow state synchronization set comprising service tasks, actions, metadata, and/or workflow exceptions relating to the workflow state, the workflow state synchronization set defining a workflow state pair that comprises the workflow state at the first content management system, the mirrored associated workflow state at the second content management system, and the communication channel between them.

6. A computer program product as in claim 5, wherein the workflow state synchronization set pushes information relevant to execution of tasks of the workflow state to the second content management system installation from the first content management system installation and pulls information relevant to execution of tasks of the workflow state performed at the second content management system installation back to the first content management system installation.

7. A system comprising:
computer configured to perform operations comprising:
executing, by a cloud-based first content management system installation, a workflow instance based on a business process application whose definition is maintained in a first content management system repository, the workflow instance requiring operations on a content item stored in a second content management system repository but not in the first content management system repository, the first content management system installation comprising a synchronization service;
implementing, by the synchronization service, a communication channel between the workflow state of the workflow instance and an associated workflow state of a second content management system installation, the second content management system installation includes the second content management system repository implemented on an on-premise computing system and protected by a firewall;
synchronizing the workflow state of the workflow instance to the associated workflow state of the second content management system installation, the synchronizing comprising exchanging content of the workflow state and metadata characterizing parameters of the workflow state over the communication channel so that the content and metadata are mirrored from the first content management system repository to the second content management system repository; and accessing a content item retained in the second content management system repository for use in the workflow instance via the mirrored associated workflow state at the second content management system repository.

8. A system as in claim 7, wherein the operations further comprise keeping the content item continuously protected by the firewall during the accessing of the content item by the mirrored associated workflow state.

9. A system as in claim 7, wherein the workflow instance comprises at least one other workflow state that is not mirrored to the second content management repository.

10. A system as in claim 7, wherein the operations further comprise: proceeding with operation of the workflow instance as though the workflow instance were being handled entirely by the first content management system installation, and wherein the first content management system repository maintains a complete set of case data relating to the workflow instance.

11. A system as in claim 7, wherein the synchronizing comprises the synchronization service creating a workflow state synchronization set for the workflow state, the workflow state synchronization set comprising service tasks, actions, metadata, and/or workflow exceptions relating to the workflow state, the workflow state synchronization set defining a workflow state pair that comprises the workflow state at the first content management system, the mirrored associated workflow state at the second content management system, and the communication channel between them.

12. A system as in claim 11, wherein the workflow state synchronization set pushes information relevant to execution of tasks of the workflow state to the second content management system installation from the first content management system installation and pulls information relevant to execution of tasks of the workflow state performed at the second content management system installation back to the first content management system installation.

13. A method comprising:
executing, by a cloud-based first content management system installation, a workflow instance based on a business process application whose definition is maintained in a first content management system repository, the workflow instance requiring operations on a content item stored in a second content management system repository but not in the first content management system repository, the first content management system installation comprising a synchronization service;
implementing, by the synchronization service, a communication channel between the workflow state of the workflow instance and an associated workflow state of a second content management system installation, the second content management system installation includes the second content management system repository implemented on an on-premise computing system and protected by a firewall;
synchronizing the workflow state of the workflow instance to the associated workflow state of the second content management system installation, the synchronizing comprising exchanging content of the workflow state and metadata characterizing parameters of the workflow state over the communication channel so that the content and metadata are mirrored from the first content management system repository to the second content management system repository; and accessing a content item retained in the second content management system repository for use in the workflow instance via the mirrored associated workflow state at the second content management system repository.

14. A method as in claim 13, wherein the workflow instance comprises at least one other workflow state that is not mirrored to the second content management repository.

15. A method as in claim 13, further comprising: proceeding with operation of the workflow instance as though the workflow instance were being handled entirely by the first content management system installation, and wherein the first content management system repository maintains a complete set of case data relating to the workflow instance.

16. A method as in claim 13, wherein the synchronizing comprises the synchronization service creating a workflow state synchronization set for the workflow state, the workflow state synchronization set comprising service tasks, actions, metadata, and/or workflow exceptions relating to the workflow state, the workflow state synchronization set defining a workflow state pair that comprises the workflow state at the first content management system, the mirrored associated workflow state at the second content management system, and the communication channel between them.

17. A method as in claim 16, wherein the workflow state synchronization set pushes information relevant to execution of tasks of the workflow state to the second content management system installation from the first content management system installation and pulls information relevant to execution of tasks of the workflow state performed at the second content management system installation back to the first content management system installation.

* * * * *